US010785297B2

(12) United States Patent
Trim et al.

(10) Patent No.: US 10,785,297 B2
(45) Date of Patent: Sep. 22, 2020

(54) INTELLIGENT DATASET MIGRATION AND DELIVERY TO MOBILE INTERNET OF THINGS DEVICES USING FIFTH-GENERATION NETWORKS

(71) Applicant: International Business Machines Corporation, Armonk, NY (US)

(72) Inventors: Craig M. Trim, Ventura, CA (US); Martin G. Keen, Cary, NC (US); Gandhi Sivakumar, Bentleigh (AU); Kushal Patel, Pune (IN); Sarvesh Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/168,264

(22) Filed: Oct. 23, 2018

(65) Prior Publication Data
US 2020/0128072 A1 Apr. 23, 2020

(51) Int. Cl.
*G06F 15/173* (2006.01)
*H04L 29/08* (2006.01)
(Continued)

(52) U.S. Cl.
CPC ......... *H04L 67/1095* (2013.01); *G06N 20/00* (2019.01); *H04L 67/12* (2013.01); *H04W 4/023* (2013.01)

(58) Field of Classification Search
CPC .... H04L 67/1095; H04L 67/12; H04W 4/023; G06N 20/00
See application file for complete search history.

(56) References Cited

U.S. PATENT DOCUMENTS 7,904,540 B2  3/2011 Hadad et al.
8,843,157 B2  9/2014 Miyake et al.
(Continued)

FOREIGN PATENT DOCUMENTS

WO   2016123497 A1   8/2016

OTHER PUBLICATIONS

Popeanga et al., "Real-Time Business Intelligence for the Utilities Industry," Database Systems Journal, vol. III, No. 4, 2012, pp. 15-24.

(Continued)

*Primary Examiner* — Sm A Rahman
(74) *Attorney, Agent, or Firm* — Yee & Associates, P.C.

(57) ABSTRACT

Migrating and delivering datasets to mobile Internet of Things (IoT) devices is provided. A time is predicted for delivery of one or more datasets to a target intermediate data delivery destination closest to a current geographic location of a mobile IoT device based on context and type of each detected data delivery event and the current geographic location of the mobile IoT device. The one or more datasets are migrated to the target intermediate data delivery destination closest to the current geographic location of the mobile IoT device according to the predicted time. The one or more datasets are delivered to the mobile IoT device from the target intermediate data delivery destination closest to the current geographic location of the mobile IoT device based on the context and the type of each detected data delivery event that corresponds to a particular dataset in the one or more datasets.

17 Claims, 7 Drawing Sheets

(51) Int. Cl.
*H04W 4/02* (2018.01)
*G06N 20/00* (2019.01)

(56) References Cited

U.S. PATENT DOCUMENTS

| | | | | |
|---|---|---|---|---|
| 8,949,420 | B2 | 2/2015 | Banavar et al. | |
| 2009/0287750 | A1* | 11/2009 | Banavar | H04L 29/06 |
| 2017/0093982 | A1* | 3/2017 | Shaashua | H04W 4/70 |
| 2018/0097905 | A1 | 4/2018 | Todasco et al. | |
| 2018/0176325 | A1 | 6/2018 | Liang et al. | |
| 2019/0014470 | A1* | 1/2019 | Bischinger | H04W 12/0609 |

OTHER PUBLICATIONS

Butler, "What is Edge Computing and How It's Changing the Network," Network World, Sep. 21, 2017, 7 pages. https://www.networkworld.com/article/3224893/internet-of-things/what-is-edge-computing-and-how-it-s-changing-the-network.html.

Talluri, "Why Edge Computing is Critical for the IoT," Network World, Oct. 24, 2017, 5 pages. https://www.networkworld.com/article/3234708/internet-of-things/why-edge-computing-is-critical-for-the-iot.html.

Pan et al., "Future Edge Cloud and Edge Computing for Internet of Things Applications," IEEE Internet of Things Journal, vol. 5, No. 1, Feb. 2018, pp. 439-449.

Aggarwal et al., "Securing IOT Devices Using SDN and Edge Computing," 2nd International Conference on Next Generation Computing Technologies (NGCT-2016), Oct. 14-16, 2016, pp. 877-882.

Mell et al., "The NIST Definition of Cloud Computing," National Institute of Standards and Technology Special Publication 800-145, Sep. 2011, 7 pages.

"Watson Speech to Text," IBM Cloud, accessed on Oct. 19, 2018, 6 pages. https://www.ibm.com/cloud/watson-speech-to-text.

* cited by examiner

INTELLIGENT DATASET MIGRATION AND DELIVERY TO MOBILE INTERNET OF THINGS DEVICES USING FIFTH-GENERATION NETWORKS

BACKGROUND

1. Field

The disclosure relates generally to wireless communication networks and more specifically to intelligently migrating and delivering datasets to mobile Internet of Things devices using a service orchestration layer of a fifth-generation network.

2. Description of the Related Art

The Internet of things (IoT) is a network of physical devices, such as smart vehicles, smart televisions, smart home appliances, smart thermostats, smart exercise monitors, and the like, which are embedded with electronics, software applications, sensors, actuators, and connectivity enabling these devices to connect, collect, and exchange data creating opportunities for more direct integration of the physical world into computer-based systems. This results in increased device efficiency, increased economic benefits, and decreased human interactions with these devices. IoT involves extending network connectivity beyond standard devices, such as desktop computers, laptop computers, handheld computers, and smart phones, to any range of traditionally non-network-enabled devices. Embedded with technology, these traditionally non-network-enabled devices can now communicate and interact over a network. In addition, these devices can be remotely monitored and controlled. It is estimated that 30 billion IoT devices will exist by 2020.

Fifth-generation (5G) mobile telecommunication networks succeed fourth-generation (4G), third-generation (3G), and second-generation (2G) systems. 5G performance includes higher data rates to move more data, reduced latency to be more responsive, increased energy savings, cost reductions, higher system capacity, and greater device connectivity to service more devices at the same time. 5G may provide network speeds of up to 20 gigabits per second.

Software-defined networking (SDN) and network functions virtualization (NFV) play a role in 5G to scale networks quickly. SDN carves virtual "sub-networks" or slices that can be then used for bigger bandwidth applications. This includes video, which may need throughput speeds of 10 gigabits per second, as well as lower bandwidth applications to connect devices that are less demanding on the network, such as smart appliances.

5G networks use a system of cell sites that divide their territory into sectors and send encoded data via radio waves. Each cell site is connected to a network backbone via wired or wireless connections. 5G may also transmit over unlicensed frequencies currently used for Wireless-Fidelity (Wi-Fi), without conflicting with existing Wi-Fi networks.

Thus, 5G networks are more likely to be networks of small cells, even down to the size of home routers rather than huge towers radiating great distances. This small cell size is partly due to the frequencies used, but also is used to expand network capacity. For example, the more cells that exist in a network, the more data that can enter the network. As a result, 5G networks need to be smarter than previous systems because 5G networks manage an increased number of smaller cells that can change in size and shape.

SUMMARY

According to one illustrative embodiment, a computer-implemented method for migrating and delivering datasets to mobile IoT devices is provided. A computer predicts a time for delivery of one or more of one or more datasets to a target intermediate data delivery destination in a set of target intermediate data delivery destinations closest to a current geographic location of a mobile IoT device based on context and type of each detected data delivery event and the current geographic location of the mobile IoT device. The computer migrates the one or more of the one or more datasets to the target intermediate data delivery destination in the set closest to the current geographic location of the mobile IoT device according to the predicted time for delivery. The computer delivers the one or more of the one or more datasets to the mobile IoT device from the target intermediate data delivery destination in the set closest to the current geographic location of the mobile IoT device based on the context and the type of each detected data delivery event that corresponds to a particular dataset in the one or more datasets. According to other illustrative embodiments, a computer system and computer program product for migrating and delivering datasets to mobile IoT devices are provided.

DETAILED DESCRIPTION

Figure 1:
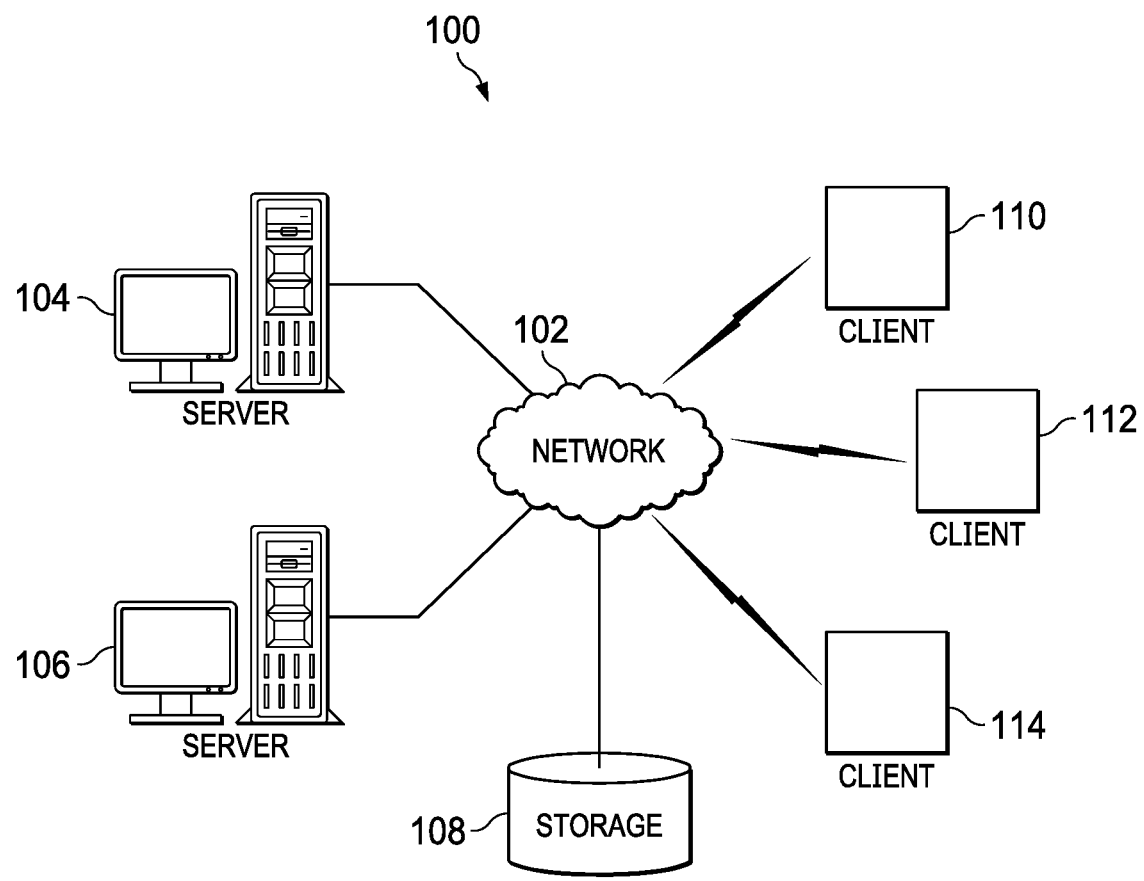
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-5, diagrams of data processing environments are provided in which illustrative embodiments may be implemented. It should be appreciated that FIGS. 1-5 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, mobile IoT devices, and other devices in which the illustrative embodiments may be implemented. Network data processing system 100 contains network 102, which is the medium used to provide communications links between the computers, mobile IoT devices, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 provide a set of services that manage and facilitate access to datasets by client IoT devices that are in motion according to a defined plan of movement. Also, it should be noted that server 104 and server 106 may each represent clusters of servers in data centers. Alternatively, server 104 and server 106 may each represent computing nodes in a cloud environment that hosts dataset migration and delivery services.

Client 110, client 112, and client 114 also connect to network 102. Clients 110, 112, and 114 are clients of server 104 and/or server 106. In this example, clients 110, 112, and 114 represent 5G-enabled mobile IoT devices with wireless communication links to network 102. For example, clients 110, 112, and 114 may represent autonomous or semi-autonomous vehicles, such as automobiles, trucks, vans, semis, buses, trains, subways, and the like, autonomous or semi-autonomous watercraft, such as boats, ships, submarines, and the like, autonomous or semi-autonomous aircraft, such as, drones, gliders, planes, jets, helicopters, and the like, autonomous or semi-autonomous robots, such as domestic robots, industrial robots, military robots, and the like, smart implants, such as pacemakers, heart monitors, and the like, smart wearables, such as exercise monitors, blood pressure monitors, and the like, and mobile sensors, such as moving environmental sensors, animal tracking tags, and the like, all enabled with 5G communication capabilities. However, it should be noted that clients 110, 112, and 114 are examples only and may represent any other type of mobile IoT device, such as, for example, a laptop computer, handheld computer, smart phone, smart watch, mobile gaming device, personal digital assistant, and the like. Owners and users of clients 110, 112, and 114 may utilize clients 110, 112, and 114 to register with and utilize the dataset migration and delivery services provided by server 104 and server 106.

Storage 108 is a network storage device capable of storing any type of data in a structured format or an unstructured format. In addition, storage 108 may represent a plurality of network storage devices. Further, storage 108 may store identifiers and network addresses for a plurality of different client devices, identifiers for a plurality of different client device owners and users, IoT device profiles, datasets, and the like. Furthermore, storage unit 108 may store other types of data, such as authentication or credential data that may include user names, passwords, and biometric data associated with system administrators and client device owners and users, for example.

In addition, it should be noted that network data processing system 100 may include any number of additional servers, mobile IoT client devices, storage devices, and other devices not shown. Program code located in network data processing system 100 may be stored on a computer readable storage medium and downloaded to a computer or mobile IoT client device for use. For example, program code may be stored on a computer readable storage medium on server 104 and downloaded to mobile IoT client 110 over network 102 for use on mobile IoT client 110.

In the depicted example, network data processing system 100 may be implemented as a number of different types of communication networks, such as, for example, a 5G telecommunications network, a radio access network, an optical fixed access network, a content delivery network, an internet, an intranet, a local area network (LAN), a wide area network (WAN), a wireless fidelity (Wi-Fi) network, a personal area network (PAN), or any combination thereof. FIG. 1 is intended as an example only, and not as an architectural limitation for the different illustrative embodiments.

Figure 2:
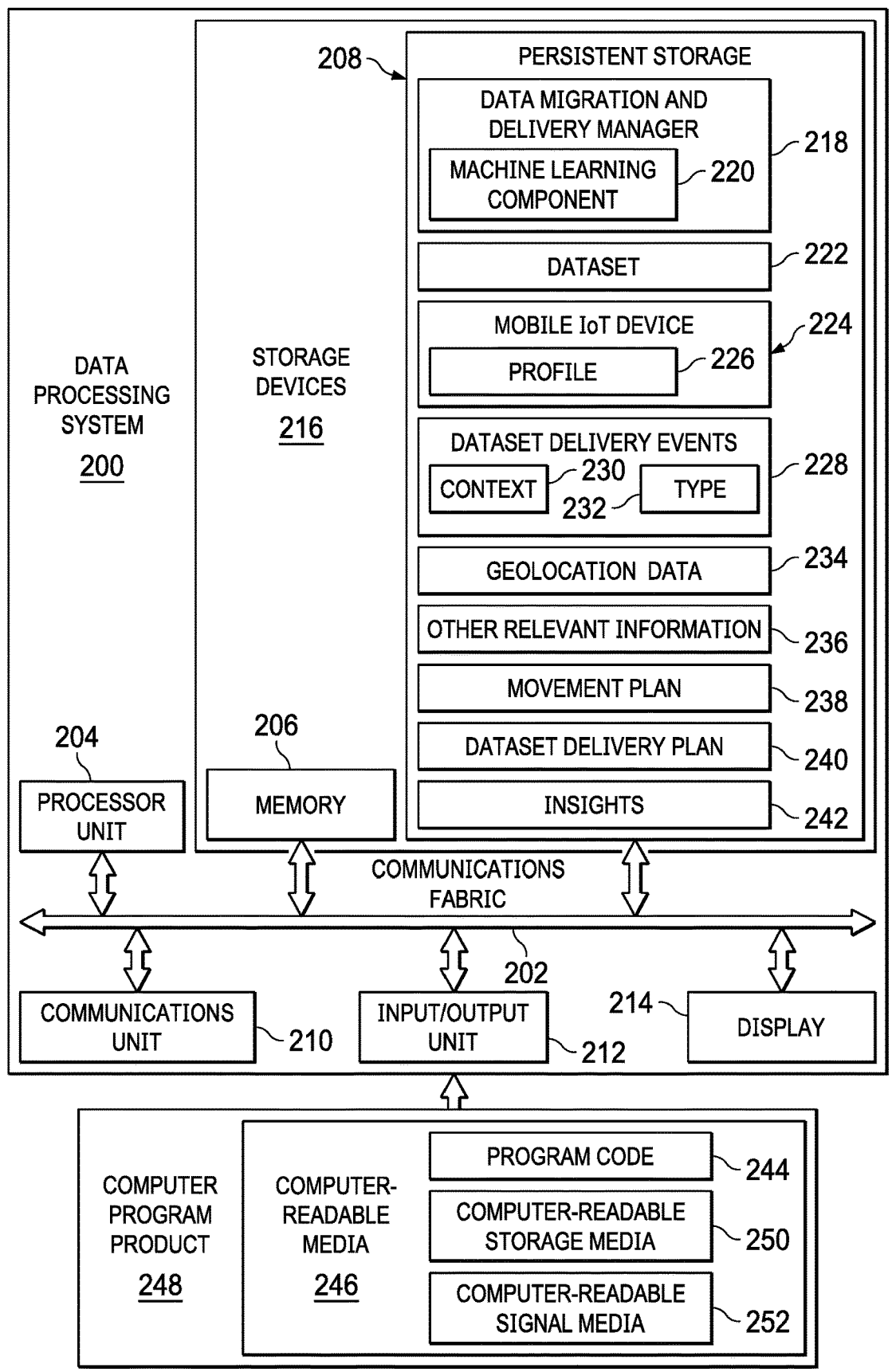
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores data migration and delivery manager 218. However, it should be noted that even though data migration and delivery manager 218 is illustrated as residing in persistent storage 208, in an alternative illustrative embodiment data migration and delivery manager 218 may be a separate component of data processing system 200. For example, data migration and delivery manager 218 may be a hardware component coupled to communication fabric 202 or a combination of hardware and software components. In another alternative illustrative embodiment, a first set of components of data migration and delivery manager 218 may be located in data processing system 200 and a second set of components of data migration and delivery manager 218 may be located in a second data processing system, such as, for example, server 106 or client 110 in FIG. 1.

Data migration and delivery manager 218 controls the process of managing and facilitating access to datasets in a distributed wireless communication network by 5G-enabled mobile IoT devices that are in motion using a service orchestration layer of a 5G network. Data migration and delivery manager 218 includes machine learning component 220. Machine learning component 220 may be, for example, an artificial intelligence program or the like. Data migration and delivery manager 218 utilizes machine learning component 220 to detect, analyze, and learn data access patterns of mobile IoT client devices and intelligently generate dataset delivery plans for these mobile IoT client devices.

Dataset 222 represents any type of data, content, or information, such as, for example, streaming data, alphanumeric content, still images, graphics, symbols, video content, audio content, or any combination thereof. In addition, dataset 222 may represent one or more sets of data. Further, dataset 222 may include, for example, device instructions, device maintenance information, device management information, device security information, device software update information, device software patch information, and the like. Data migration and delivery manager 218 migrates or copies and migrates dataset 222 from one or more storage devices, such as storage 108 in FIG. 1, to a set of one or more target intermediate data delivery destinations, such as, for example, cellular towers, E-Node B towers, and/or data centers, which is closest to mobile IoT device 224 while mobile IoT device 224 is in motion. Data migration and delivery manager 218 migrates dataset 222 to the set of target intermediate data delivery destinations in response to a request for dataset 222 by mobile IoT device 224 or in response to machine learning component 220 predicting that mobile IoT device 224 needs or wants to receive dataset 222 based on learned insights, historical data, and real-time data. Mobile IoT device 224 represents a unique identifier for the mobile IoT client device that will receive or is receiving dataset 222. Also, it should be noted that mobile IoT device 224 may represent a plurality of different mobile IoT client devices registered with data migration and delivery manager 218.

Profile 226 represents a device profile that corresponds to mobile IoT device 224. Data migration and delivery manager 218 may retrieve profile 226 from a storage device located on mobile IoT device 224 or from a remote database or storage device, such as storage 108 in FIG. 1. Alternatively, machine learning component 220 may generate profile 226 over time based on learned insights and store profile 226 on a storage device coupled to data processing system 200. Profile 226 includes, for example, specification information, such as name, type, model, serial number, description, and the like, corresponding to mobile IoT device 224; data delivery preferences of mobile IoT device 224, such as what type of network (e.g., public WiFi network) to use to deliver dataset 222 and under what circumstances (e.g., at a public airport terminal to avoid roaming charges); dataset access patterns of mobile IoT device 224; historical movement patterns of mobile IoT device 224; and the like.

Data delivery events 228 represent events or activities that would trigger data migration and delivery manager 218 to deliver dataset 222 to mobile IoT device 224. An example of a data delivery event may be, for example, mobile IoT device 224, which is a smart pacemaker in this example, arriving at a particular location, such as a specified hospital, clinic, or doctor's office, at a designated date and time, to automatically receive a needed software update and other programming to increase the operation and performance of mobile IoT device 224. In addition, data delivery events 228 include context 230 and type 232. Context 230 represents the circumstances surrounding or corresponding to a particular data delivery event. For example, context 230 may be a normal data delivery event, a high-importance data delivery event, a low-importance data delivery event, or a critical data delivery event. Type 232 represents the category or class of data delivery event. For example, type 232 may be an essential data delivery event, a desired data delivery event, or an optional data delivery event. An essential data delivery event is a dataset that is needed or required by mobile IoT device 224 for performance and operation at that point in time. A desired data delivery event is a dataset that is wanted by mobile IoT device 224, but may be delivered now or at a later time. An optional data delivery event is a dataset that may or may not be delivered to mobile IoT device 224 without consequence to operation or performance.

Geolocation data 234 represent current geographic location information corresponding to mobile IoT device 224. Geolocation data 234 may be, for example, geographic coordinates. Data migration and delivery manager 218 may receive geolocation data 234 from, for example, a GPS transceiver located on mobile IoT device 224. Alternatively, data migration and delivery manager 218 may determine geolocation data 234 for mobile IoT device 224 using, for example, cellular tower triangulation or E-Node B 3D trilateration methods.

Other relevant information 236 represents additional information that machine learning component 220 may utilize to intelligently develop a delivery plan for dataset 222. For example, other relevant information 236 may include map information, topographical information, environment information, and weather information corresponding to the current geographic location or scheduled future geographic location of mobile IoT device 224. Data migration and delivery manager 218 may retrieve the map, environment, and weather information from one or more remote storage devices or databases.

Movement plan 238 represents a planned or scheduled route of movement for mobile IoT device 224. Data migration and delivery manager 218 may receive movement plan 238 from textual or voice inputs provided by an owner or user of mobile IoT device 224. Alternatively, data migration and delivery manager 218 may generate movement plan 238 based on information gleaned from, for example, electronic calendar entries, text messages, emails, social media posts, and the like, which correspond to the owner or user of mobile IoT device 224. Movement plan 238 includes, for example, type of movement, such as short distance movement, long distance movement, temporary movement, persistent movement, and the like; mode of movement, such as land, air, water, and the like, planned route of movement; movement time schedule; scheduled stops along the planned route of movement; and the like.

Data migration and delivery manager 218 generates dataset delivery plan 240 based on insights 242 derived from information associated with dataset 222, profile 226, dataset delivery events 228, geolocation data 234, other relevant information 236, and movement plan 238. Insights 242 represent understanding and knowledge gained by machine learning component 220 analyzing contents of the different information sources. Dataset delivery plan 240 is a plan for intelligently migrating and delivering dataset 222 to mobile IoT device 224 while mobile IoT device 224 is in motion according to movement plan 238. Dataset delivery plan 240 may include, for example, one or more target intermediate data delivery destinations for all or a portion of dataset 222 to be delivered to mobile IoT device 224 at scheduled times. For example, movement plan 238 may indicate that mobile IoT device 224 is in transit from Bangalore to Paris by air with a one-hour scheduled layover in between. The intermediate data delivery target destination may be, for example, a Wi-Fi network server, cellular tower, E-Node B hardware, or data center server, located in, adjacent to, or nearest to the airport terminal corresponding to the scheduled layover. Data migration and delivery manager 218 migrates all or a portion of dataset 222 to that particular intermediate data delivery target destination, just prior to or during the scheduled one-hour layover time interval.

Communications unit 210, in this example, provides for communication with computers, mobile IoT devices, and data processing systems via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, Wi-Fi, Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 244 is located in a functional form on computer readable media 246 that is selectively removable and may be loaded onto or transferred to data processing system 200 for running by processor unit 204. Program code 244 and computer readable media 246 form computer program product 248. In one example, computer readable media 246 may be computer readable storage media 250 or computer readable signal media 252. Computer readable storage media 250 may include, for example, an optical or magnetic disc that is inserted or placed into a drive or other device that is part of persistent storage 208 for transfer onto a storage device, such as a hard drive, that is part of persistent storage 208. Computer readable storage media 250 also may take the form of a persistent storage, such as a hard drive, a thumb drive, or a flash memory that is connected to data processing system 200. In some instances, computer readable storage media 250 may not be removable from data processing system 200.

Alternatively, program code 244 may be transferred to data processing system 200 using computer readable signal media 252. Computer readable signal media 252 may be, for example, a propagated data signal containing program code 244. For example, computer readable signal media 252 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 244 may be downloaded over a network to persistent storage 208 from another device or data processing system through computer readable signal media 252 for use within data processing system 200. For instance, program code stored in a computer readable storage media in a data processing system may be downloaded over a network from the data processing system to data processing system 200. The data processing system providing program code 244 may be a server computer, a client device, or some other device capable of storing and transmitting program code 244.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 250 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
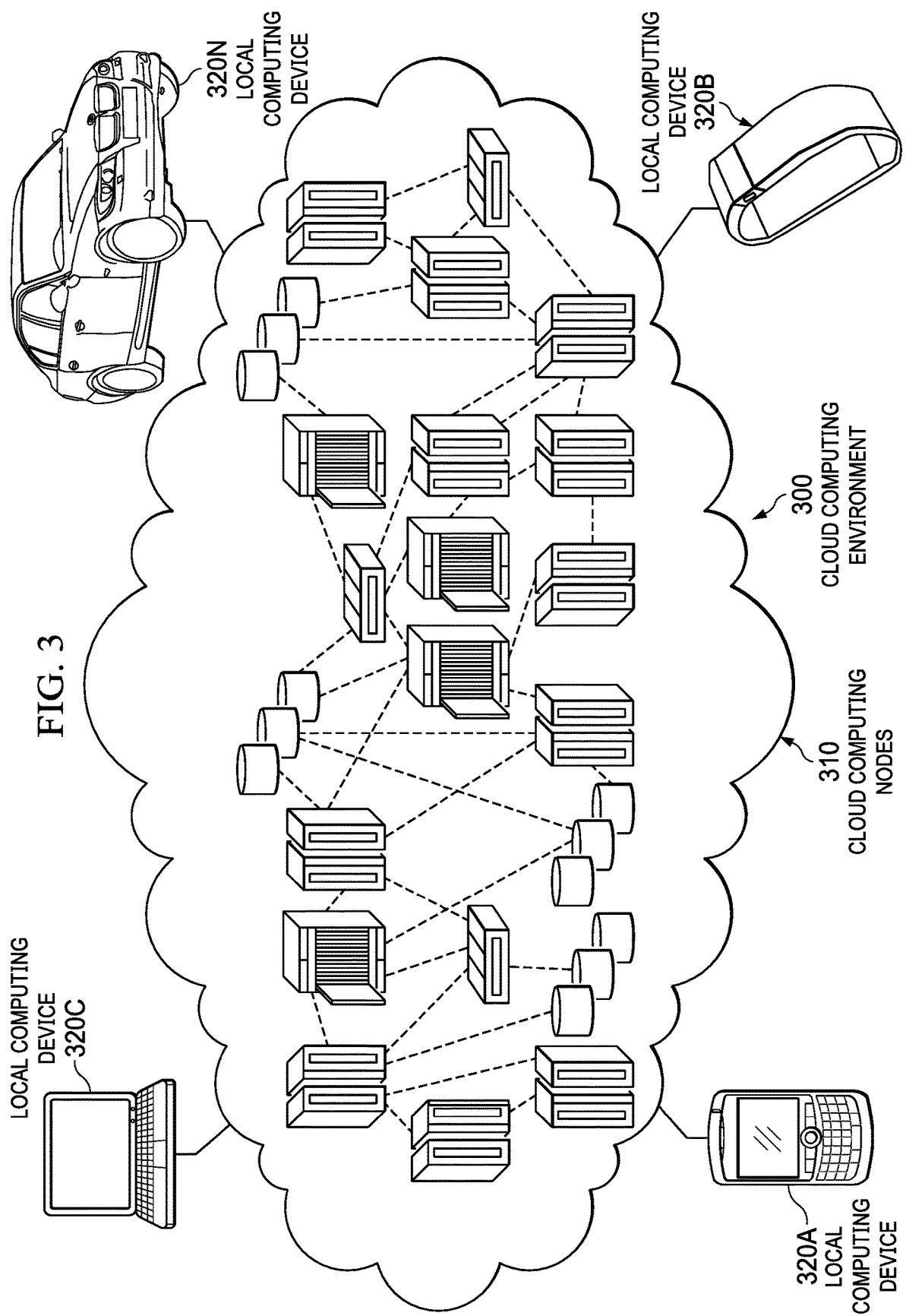
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or a smart phone 320A, smart exercise monitor 320B, laptop computer 320C, and/or smart automobile computer system 320N, may communicate. Cloud computing nodes 310 may be, for example, server 104 and server 106 in FIG. 1. Local computing devices 320A-320N may be, for example, clients 110-114 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
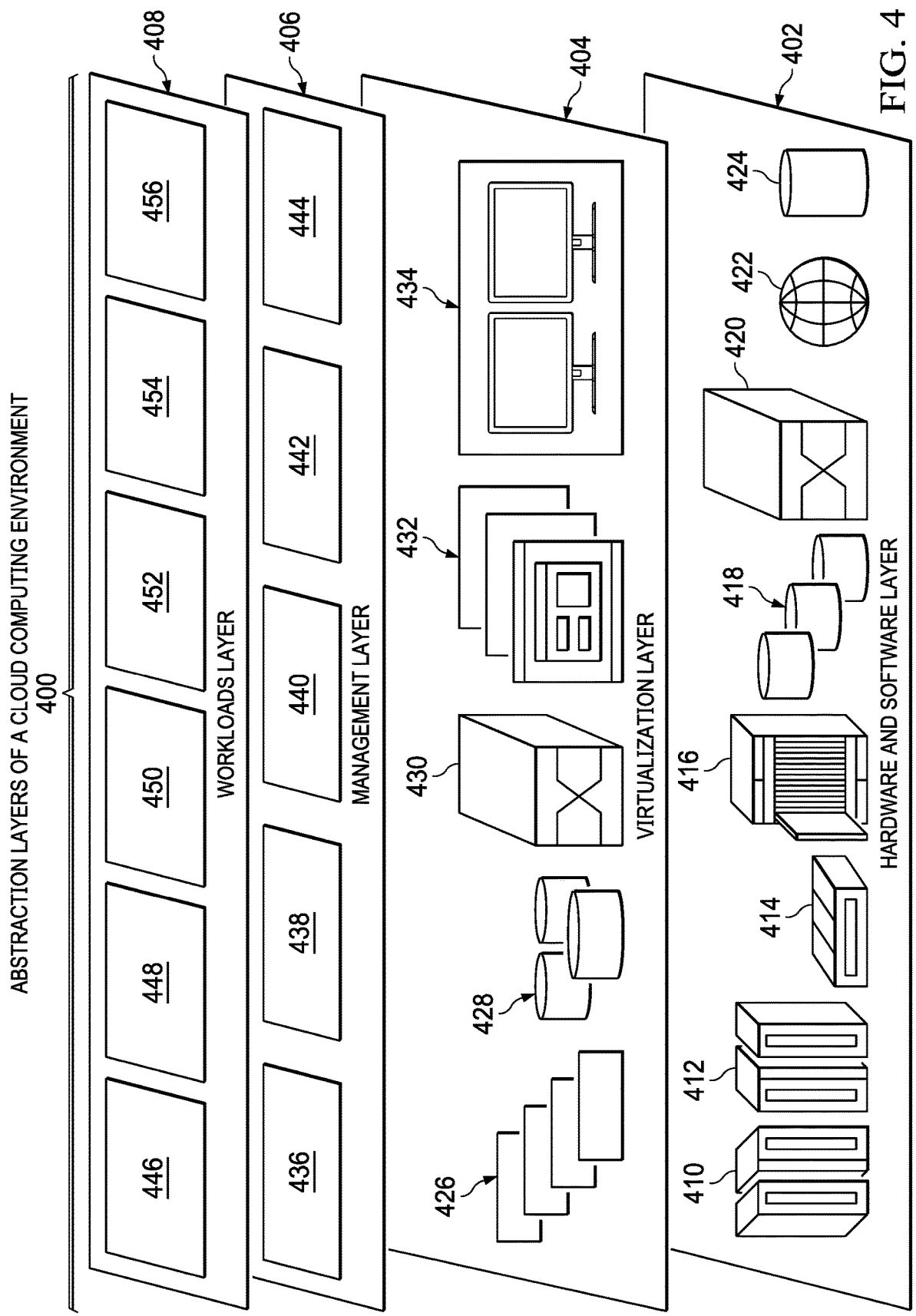
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 include hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and dataset migration and delivery management 456.

Advancements in the telecommunication industry has enabled many technologies, such as Artificial Intelligence (AI), to succeed by breaking the barrier of various factors like sedentary operations, low bandwidth, and the like. 4G telecommunication technology pushed such technologies to an upper stratum by parallelizing the physical channel, thus providing higher bandwidth. 5G technology is expected to push dependent technologies to an even higher level through mobility bandwidth of one gigabit per second, convergence of IoT device access, and the like. One feature of 5G is that the network, itself, is intelligent and cognitive. Thus, a 5G network is expected to become a part of the human community through various features including observing surroundings, reasoning, inferring, and making decisions like humans.

Currently, data delivered and stored by service providers is highly static and is highly dependent on the service providers' knowledge and understanding of IoT device data delivery preferences and geographic location. If an IoT device that accesses data from a service provider's server is moving, then data served by the IoT device's service provider's network moves slowly and takes an increased amount of time to reach the IoT device with existing 4G networks. No mechanism currently exists by which data delivery can be automated considering IoT device data delivery preference and geographic location. Also, no mechanism currently exists by which a service orchestration layer of a 5G network can identify dataset types, dataset views, IoT mobility patterns, and IoT device owner preferences and, accordingly, autonomously update dataset delivery using datasets that can be served quickly to mobile IoT devices.

Illustrative embodiments utilize an apparatus to observe and infer the state of mobile IoT devices, such as their geographic locations, movement patterns, dataset usage patterns, and dataset delivery preferences, which will trigger a data delivery network to tune the requested dataset accordingly considering predicted IoT device location and type of dataset format needed for the given IoT device geographic location and circumstances. Illustrative embodiments provide an apparatus working in the service orchestration layer of the 5G network, along with co-existing smart channel monitoring tools in 4G compatible platforms, that identifies insights and understanding into dataset delivered by network service providers and other data servers, such as private data providers. This is similar to an IoT device that utilizes a telecommunications service provider for data delivery of one type, but uses a private data provider, which only offers a particular type of data. In this case, the mobile IoT device is connected to both networks (i.e., one network for one dataset type and another network for a different dataset type).

Illustrative embodiments intelligently determine a data access pattern of a mobile IoT device based on mode of movement corresponding to the mobile IoT device, detect data requirements for a context of the movement, convert the data access pattern to a data migration plan for processing, analyze delivered data to identify insights and understanding into the delivered data, detect data delivery requirements for the delivered data, such as, for example, the mobile IoT device's frequency of accessing the data, optimal time to deliver the data when the mobile IoT device is in motion, type of data delivered, geographic location of the mobile IoT device, time zone of that geographic location, local culture in that geographic location, environment of that geographic location, and the like, and autonomously deliver the data to the mobile IoT device based on the identified insights. Illustrative embodiments may also utilize a profile corresponding to the mobile IoT device to determine type of movement, such as temporary movement, long-duration movement, short-distance movement, or long-distance movement, data delivery settings of the mobile IoT device, and the like. Then, illustrative embodiments determine the data delivery requirements based on the type of movement, geographic location, and data delivery settings corresponding to the mobile IoT device and then migrate the data to a target data delivery location closest to the mobile IoT device accordingly.

Illustrative embodiments may also detect the data delivery requirements by mapping the type of movement to other disclosed parameters, such as mode of movement (e.g., air, water, road, rail, public transport, private transport, and the like), context of movement (e.g., normal, emergency, and the like), stops along the planned path of movement (e.g., maintenance stops, recharging stops, layovers, and the like) and take these other parameters into account when migrating the data closer to the mobile IoT device. For example, if an autonomous vehicle, such as an automobile, is traveling and has a scheduled maintenance stop at service station "X" for 3 hours, then illustrative embodiments may determine that the autonomous vehicle is most likely to access local area road maps to calculate optimal travel route. As a result, illustrative embodiments intelligently migrate the dataset (i.e., local area road maps) to a target data delivery location, such as a particular cellular tower, E-Node B tower, or data center, closest to the geographic location of the mobile IoT device (i.e., autonomous vehicle) and update the content distribution network for the same when operated in network operations center mode. Further, illustrative embodiments may also consider mood of the user (e.g., happy, sad, angry, and the like) when determining what type of data content to deliver to the user. Furthermore, illustrative embodiments may receive inputs from an owner of the mobile IoT device for accurate dataset migration when the mobile IoT device is not available on any network, such as, for example, when the mobile IoT device is onboard an airplane in flight.

Illustrative embodiments work in the service orchestration layer of a 5G network and poll for dataset requests and associated content to be delivered to a mobile IoT device. Based on discovered insights, illustrative embodiments apply classifications on requested datasets to place the requested datasets into essential datasets, desired datasets, and optional datasets. By retrieving movement information from various electronic sources (e.g., device profile), illustrative embodiments are able to generate a movement plan, such as temporary movement or long-term movement, for the mobile IoT device. Illustrative embodiments also determine target intermediate data delivery destinations for requested datasets by considering movement mode, movement context, time schedule, stops along route of movement, and other specified factors corresponding to the mobile IoT device.

Illustrative embodiments map a machine learning program's information to local information, along with several other parameters, and activate triggers to a content distribution network and data storage services to migrate the requested dataset or datasets closer to the geographic location of the mobile IoT device based on determined timetables when operated in network operations center mode. Once illustrative embodiments generate an intelligent data migration plan, illustrative embodiments push requested datasets to selected servers via a data delivery network based on the final destination of the mobile IoT device and any stops along the route of movement. Upon migration of the requested datasets, illustrative embodiments update data routing indices for increased performance of routing requested datasets to different geolocations in the future.

Illustrative embodiments utilize a data migration and delivery manager, which includes a graphical user interface-based component, having a plurality of capabilities. For example, the data migration and delivery manager is capable of interfacing with electronic data sources, such as, for example, map databases, text messaging systems, email systems, social media websites, and the like, where an owner of a 5G-enabled mobile IoT device can define movement information corresponding to that particular 5G-enabled mobile IoT device. The data migration and delivery manager captures the geographic location of the 5G-enabled mobile IoT device by utilizing, for example, existing GPS, cellular tower triangulation, and/or E-Node B 3D trilateration techniques. In addition, the data migration and delivery manager determines dataset delivery events, such as essential, desired, and optional dataset delivery events.

The data migration and delivery manager also identifies the context related dataset needs depending upon the temporal needs, situational needs, and other needs, as well as target intermediate dataset delivery destinations along a path of movement of the mobile IoT device. For example, an aging autonomous vehicle given a current extended travel route will have an increased probability of breaking down, requiring the data migration and delivery manager to migrate service data to edge intermediate data delivery servers, while management data of the aging autonomous vehicle, which is needed for statistics, may only be needed at ingress and egress data delivery servers corresponding to the planned travel route. The data migration and delivery manager integrates with existing provisioning systems for provisioning and de-provisioning of datasets and predicts the timelines of need. Furthermore, the data migration and delivery manager predicts the probability of a particular mobile IoT device accessing a particular dataset based on learned data access patterns of that particular mobile IoT device and autonomously migrates the particular dataset via triggering a content delivery network for data migration.

Figure 5:
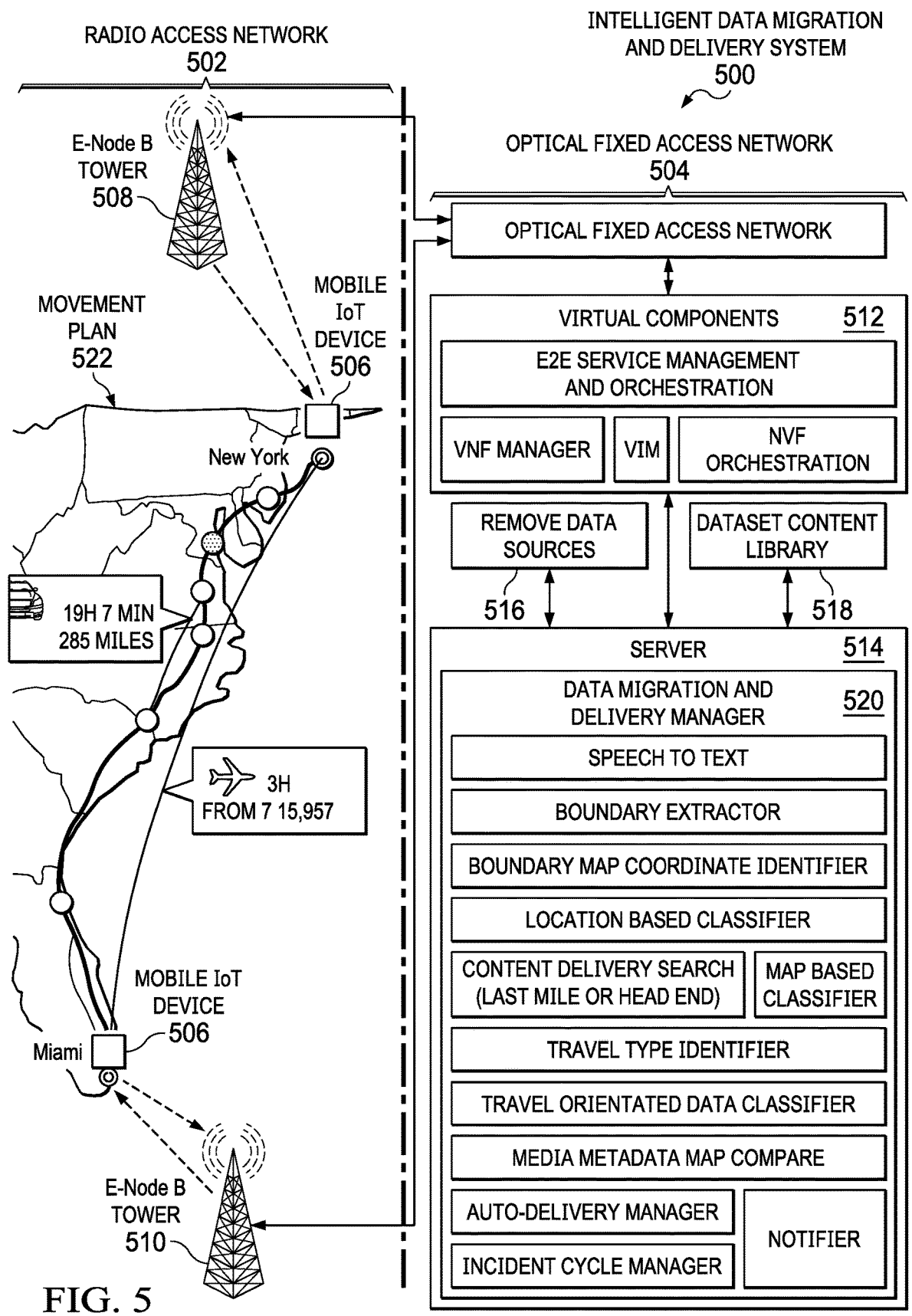
FIG. 5 is a diagram illustrating an example of an intelligent data migration and delivery system in accordance with an illustrative embodiment.

With reference now to FIG. 5, a diagram illustrating an example of an intelligent data migration and delivery system is depicted in accordance with an illustrative embodiment. Intelligent data migration and delivery system 500 may be implemented in a network of data processing systems, such as network data processing system 100 in FIG. 1, or a cloud computing environment, such as cloud computing environment 300 in FIG. 3. Intelligent data migration and delivery system 500 is a system of hardware and software components for managing and facilitating access to datasets in a distributed wireless communication network by 5G-enabled mobile IoT devices that are moving in accordance with a defined movement plan using a service orchestration layer of a 5G network.

In this example, intelligent data migration and delivery system 500 includes radio access network 502, optical fixed access network 504, mobile IoT device 506, E-Node B tower 508, E-Node B tower 510, virtual components 512, server 514, remote data sources 516, and dataset content library 518. However, it should be noted that intelligent data migration and delivery system 500 is intended as an example only and not as a limitation on different illustrative embodiments. In other words, intelligent data migration and delivery system 500 may include any number of devices and components not shown.

Radio access network 502 and optical fixed access network 504 provide communication links between the different devices and components (e.g., mobile IoT device 506, E-Node B tower 508, E-Node B tower 510, virtual components 512, server 514, remote data sources 516, and dataset content library 518) located within intelligent data migration and delivery system 500. Mobile IoT device 506 represents any type of IoT device that is capable of autonomous movement or is capable of being transported, moved, worn, or carried by or incorporated into an animate object, such as a human or animal, or an inanimate object, such as a vehicle or airplane. For example, mobile IoT device 506 may be an autonomous or semi-autonomous vehicle, an autonomous or semi-autonomous watercraft, an autonomous or semi-autonomous aircraft, an autonomous or semi-autonomous robot, a smart implant, a smart wearable, a mobile sensor, a laptop computer, a handheld computer, a smart phone, a smart watch, a mobile gaming device, a personal digital assistant, and the like. In addition, mobile IoT device 506 represents a plurality of mobile IoT devices located within intelligent data migration and delivery system 500.

E-Node B tower 508 and E-Node B tower 510 represent a plurality of E-Node B towers and other hardware that provide wireless communication links to and from mobile devices, such as mobile IoT device 506, within radio access network 502. E-Node B tower 508 and E-Node B tower 510 are coupled to optical fixed access network 504, which in turn is coupled to virtual components 512 and server 514. Thus, intelligent data migration and delivery system 500 is able to utilize E-Node B tower 508 and E-Node B tower 510 to wirelessly transfer datasets and other information from server 514 to mobile IoT device 506 and to send real-time information from mobile IoT device 506 to server 514.

In this example, virtual components 512 include end-to-end service management and orchestration, network functions virtualization orchestration, virtual network functions management, and virtual infrastructure management for coordinating resources, such as firewalls, load balancers, and the like, and networks needed to provide the dataset migration and delivery services provided by data migration and delivery manager 520 of server 514. Server 514 may be, for example, server 104 in FIG. 1 or data processing system 200 in FIG. 2. Data migration and delivery manager 520 may be, for example, data migration and delivery manager 218 in FIG. 2.

In this example, data migration and delivery manager 520 includes a speech-to-text component, a boundary extractor, a boundary map coordinate identifier, a map-based classifier, a location-based classifier, a content delivery search component, a travel type identifier, a travel-oriented data classifier, a media metadata map compare component, a notifier, an auto-delivery manager, and an incident cycle manager. However, it should be noted that data migration and delivery manager 520 may include more or fewer component than shown. For example, two or more components may be combined into one component or one component may be divided into two or more components. In addition, components not shown may be added or components shown may be removed.

The speech-to-text component converts mobile IoT device owner or user voice inputs to textual data for analysis by data migration and delivery manager 520. The boundary extractor determines how much data needs to be extracted for a particular geographic location based on events. The boundary map coordinate identifier identifies geographic coordinates of the mobile IoT device for delivering the dataset to one or more target intermediate data delivery destinations, as well as a final IoT device destination. The map-based classifier classifies map information for delivering the dataset to a target destination. The location-based classifier classifies geographic location information corresponding to the mobile IoT device. The content delivery search component predicts when the mobile IoT device is close to or has arrived at the set of target data delivery destinations. The travel type identifier identifies the type of movement, such as long-distance movement, corresponding to the mobile IoT device. The travel-oriented data classifier classifies retrieved movement information corresponding to the mobile IoT device for delivery of the dataset. The media metadata map compare component reads metadata corresponding to the dataset to determine restrictions associated with the dataset, such as, for example, an X-rated dataset may not be delivered to a certain geographic location due to governmental regulations or licensing issues. The notifier notifies the owner or user of the mobile IoT device regarding any errors, problems, or issues. The auto-delivery manager autonomously delivers the dataset to the mobile IoT device. The incident cycle manager tracks and records any incidents or events corresponding to delivery of the dataset to the mobile IoT device.

Remote data sources 516 represent a plurality of different information sources, such as sources of electronic calendar information, text message information, email information, social media information, weather information, environmental information, map information, time zone information, and the like. Data migration and delivery manger 520 retrieves the different types of information from remote data sources 516 to assist in generating an intelligent dataset delivery plan, such as dataset delivery plan 240 in FIG. 2, for intelligently migrating and delivering one or more datasets from dataset content library 518 to mobile IoT device 506 while mobile IoT device 506 is moving according to movement plan 522. It should be noted that data migration and delivery manager 520 may utilize a content delivery network, which is not shown, to transmit the dataset to mobile IoT device 506. Dataset content library 518 represents a plurality of different data content libraries containing a plurality of different types of data, content, and information for delivery to requesting mobile IoT devices by server 514 using data migration and delivery manger 520.

In this example, data migration and delivery manager 520 detects planned movement by mobile IoT device 506 from New York to Miami. It should be noted that mobile IoT device 506 in this example is a semi-autonomous aerial drone. In addition, data migration and delivery manager 520 detects that mobile IoT device 506 is scheduled for a 3-hour maintenance stop in Atlanta. Thus, data migration and delivery manager 520, utilizing the detected information corresponding to the flight, generates movement plan 522. Further, data migration and delivery manager 520, utilizing derived information insights, predicts the type of datasets, such as, for example, software updates, maintenance schedules, service information, navigation information, maps, and the like, which mobile IoT device 506 may need or want during the scheduled maintenance stop. Data migration and delivery manager 520 migrates the one or more datasets to a target data delivery destination closest to mobile IoT device 506 in synchronization with the time schedule of movement and the geographic location of mobile IoT device 506 during the 3-hour maintenance stop according to the intelligent data delivery plan. As a result, data migration and delivery manager 520 increases the operation and performance of mobile IoT device 506 by delivering the datasets to mobile IoT device 506.

Figure 6:
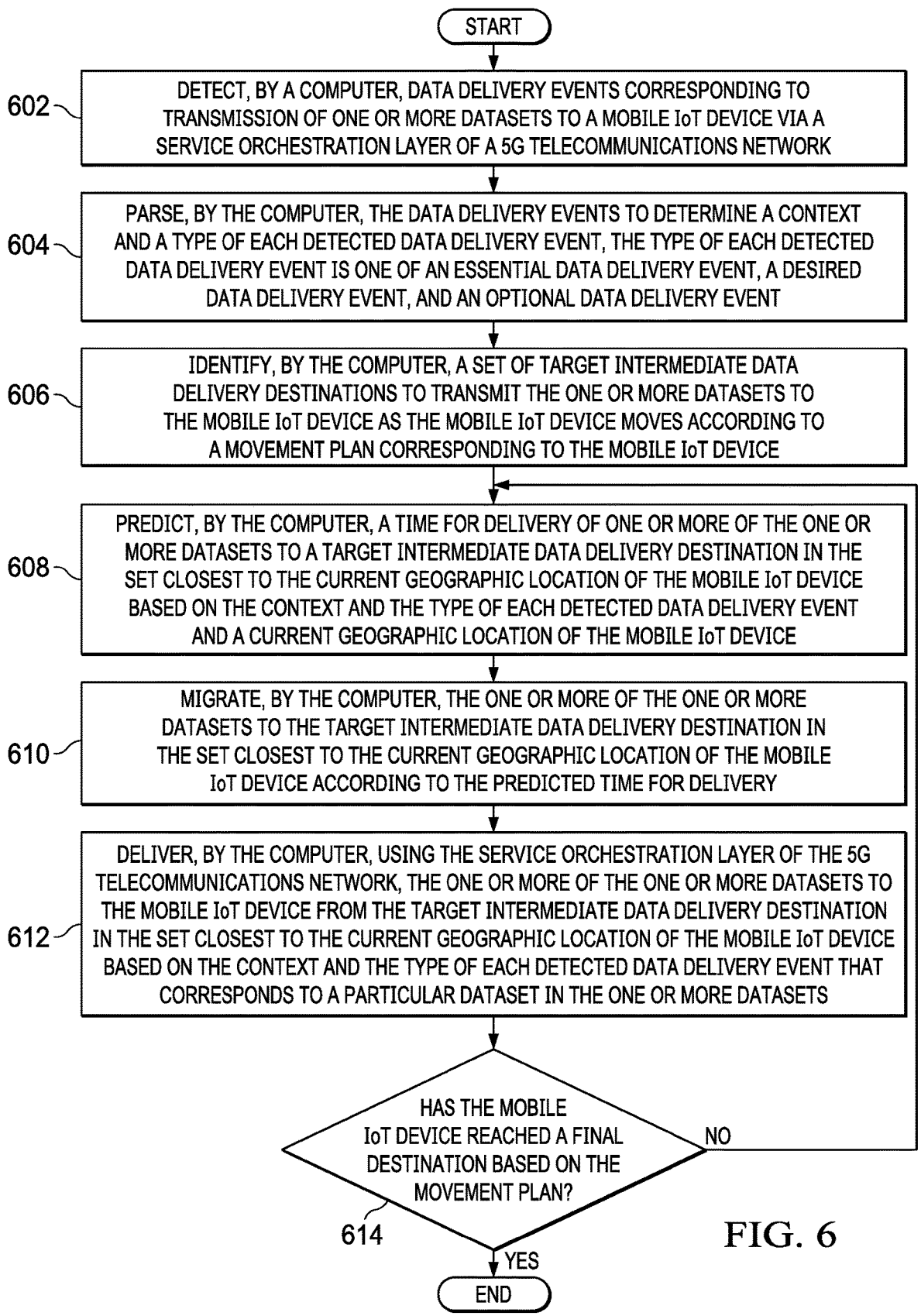
FIG. 6 is a flowchart illustrating a process for delivering datasets to 5G-enabled mobile IoT devices in accordance with an illustrative embodiment.

With reference now to FIG. 6, a flowchart illustrating a process for delivering datasets to 5G-enabled mobile IoT devices is shown in accordance with an illustrative embodiment. The process shown in FIG. 6 may be implemented in a computer in a service orchestration layer of a 5G telecommunications network, such as, for example, server 104 in FIG. 1. In addition, the process may be provided as-a-service in the 5G telecommunications network. Also, the computer collects IoT device mobility information from lower level implementations of the 5G telecommunications network to perform data migration operations.

The process begins when the computer detects data delivery events corresponding to transmission of one or more datasets to a mobile IoT device via the service orchestration layer of the 5G telecommunications network (step 602). The mobile IoT device may be, for example, mobile IoT device 506 in FIG. 5. The computer parses the data delivery events to determine a context and a type of each detected data delivery event (step 604). The type of each detected data delivery event is one of an essential data delivery event, a desired data delivery event, and an optional data delivery event.

The computer identifies a set of target intermediate data delivery destinations to transmit the one or more datasets to the mobile IoT device as the mobile IoT device moves according to a movement plan corresponding to the mobile IoT device (step 606). The computer predicts a time for delivery of one or more of the one or more datasets to a target intermediate data delivery destination in the set closest to the current geographic location of the mobile IoT device based on the context and the type of each detected data delivery event and a current geographic location of the mobile IoT device (step 608). The computer migrates the one or more of the one or more datasets to the target intermediate data delivery destination in the set closest to the current geographic location of the mobile IoT device according to the predicted time for delivery (step 610).

The computer, using the service orchestration layer of the 5G telecommunications network, delivers the one or more of the one or more datasets to the mobile IoT device from the target intermediate data delivery destination in the set closest to the current geographic location of the mobile IoT device based on the context and the type of each detected data delivery event that corresponds to a particular dataset in the one or more datasets (step 612). The computer makes a determination as to whether the mobile IoT device reached a final destination based on the movement plan (step 614). If computer determines that the mobile IoT device has not reached the final destination based on the movement plan, no output of step 614, then the process returns to step 608 where the computer predicts a next time for delivery of one or more of the one or more datasets to a next target intermediate data delivery destination in the set. If computer determines that the mobile IoT device has reached its final destination based on the movement plan, yes output of step 614, then the process terminates thereafter.

Figure 7:
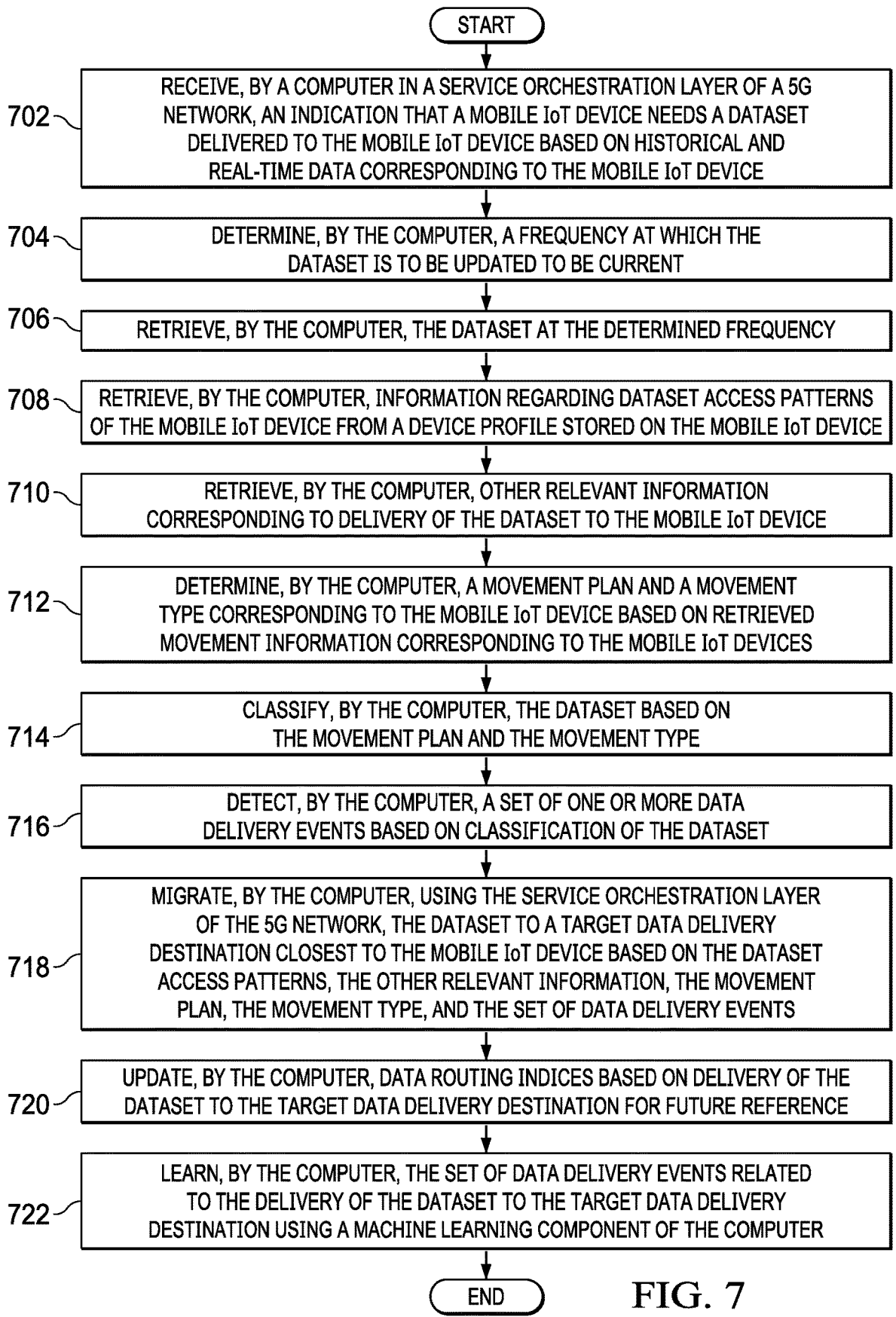
FIG. 7 is a flowchart illustrating a process for migrating datasets to target data delivery locations closest to 5G-enabled mobile IoT devices in accordance with an illustrative embodiment.

With reference now to FIG. 7, a flowchart illustrating a process for migrating datasets to target data delivery locations closest to 5G-enabled mobile IoT devices is shown in accordance with an illustrative embodiment. The process shown in FIG. 7 may be implemented in a computer in a service orchestration layer of a 5G telecommunications network, such as, for example, server 104 in FIG. 1. In addition, the process may be provided as-a-service in the 5G telecommunications network. Also, the computer collects IoT device mobility information from lower level implementations of the 5G telecommunications network to perform data migration operations.

The process begins when the computer receives an indication that a mobile IoT device needs a dataset delivered to the mobile IoT device based on historical and real-time data corresponding to the mobile IoT device (step 702). In addition, the computer determines a frequency at which the dataset is to be updated to be current (step 704). Further, the computer retrieves the dataset at the determined frequency (step 706).

The computer also retrieves information regarding dataset access patterns of the mobile IoT device from a device profile stored on the mobile IoT device (step 708). Furthermore, the computer retrieves other relevant information corresponding to delivery of the dataset to the mobile IoT device (step 710). Moreover, the computer determines a movement plan and a movement type corresponding to the mobile IoT device based on retrieved movement information corresponding to the mobile IoT device (step 712).

Afterward, the computer classifies the dataset based on the movement plan and the movement type (step 714). In addition, the computer detects a set of one or more data delivery events based on classification of the dataset (step 716). Subsequently, the computer, using the service orchestration layer of the 5G network, migrates the dataset to a target data delivery destination closest to the mobile IoT device based on the dataset access patterns, the other relevant information, the movement plan, the movement type, and the set of data delivery events (step 718).

The computer updates data routing indices based on delivery of the dataset to the target data delivery destination for future reference (step 720). The computer also learns the set of data delivery events related to the delivery of the dataset to the target data delivery destination using a machine learning component of the computer (step 722). Thereafter, the process terminates.

Thus, illustrative embodiments of the present invention provide a computer-implemented method, computer system, and computer program product for intelligently migrating and delivering one or more datasets to 5G-enabled mobile IoT devices using a service orchestration layer of a 5G network. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
predicting, by a computer, a time for delivery of one or more of one or more datasets to a target intermediate data delivery destination in a set of target intermediate data delivery destinations closest to a current geographic location of a mobile Internet of Things (IoT) device based on context and type of each detected data delivery event and the current geographic location of the mobile IoT device;
migrating, by the computer, the one or more of the one or more datasets to the target intermediate data delivery destination in the set closest to the current geographic location of the mobile IoT device according to the predicted time for delivery;
delivering, by the computer, the one or more of the one or more datasets to the mobile IoT device from the target intermediate data delivery destination in the set closest to the current geographic location of the mobile IoT device based on the context and the type of each detected data delivery event that corresponds to a particular dataset in the one or more datasets;
receiving, by the computer, an indication that the mobile IoT device needs the one or more of the one or more datasets delivered to the mobile IoT device based on historical and real-time data corresponding to the mobile IoT device;
determining, by the computer, a frequency at which the one or more datasets are to be updated to be current; and
retrieving, by the computer, the one or more datasets at the determined frequency.

2. The computer-implemented method of claim 1 further comprising:
detecting, by the computer, data delivery events corresponding to transmission of the one or more datasets to the mobile IoT device;
parsing, by the computer, the data delivery events to determine the context and the type of each detected data delivery event; and
identifying, by the computer, the set of target intermediate data delivery destinations to transmit the one or more datasets to the mobile IoT device as the mobile IoT device moves according to a movement plan corresponding to the mobile IoT device.

3. The computer-implemented method of claim 2, wherein the type of each detected data delivery event is one of an essential data delivery event, a desired data delivery event, and an optional data delivery event.

4. The computer-implemented method of claim 1 further comprising:
retrieving, by the computer, information regarding dataset access patterns of the mobile IoT device from a device profile corresponding to the mobile IoT device;
retrieving, by the computer, other relevant information corresponding to the delivery of the one or more of the one or more datasets to the mobile IoT device; and
determining, by the computer, a movement plan and a movement type corresponding to the mobile IoT device based on retrieved movement information corresponding to the mobile IoT device.

5. The computer-implemented method of claim 1 further comprising:
classifying, by the computer, the one or more datasets based on a movement plan and a movement type; and
detecting, by the computer, a set of data delivery events based on classification of the one or more datasets.

6. The computer-implemented method of claim 1 further comprising:
migrating, by the computer, the one or more of the one or more datasets to the target intermediate data delivery destination in the set closest to the mobile IoT device based on dataset access patterns, other relevant information, movement plan, movement type, and the data delivery events corresponding to the mobile IoT device.

7. The computer-implemented method of claim 1 further comprising:
updating, by the computer, data routing indices based on the delivery of the one or more of the one or more datasets to the target intermediate data delivery destination; and
learning, by the computer, a set of data delivery events related to the delivery of the one or more of the one or more datasets to the target intermediate data delivery destination using a machine learning component of the computer.

8. The computer-implemented method of claim 1, wherein the computer is located in a service orchestration layer of a fifth-generation (5G) telecommunications network, and wherein the computer-implemented method is provided as-a-service in the 5G telecommunications network; and wherein the computer collects user mobility information from lower level implementations of the 5G telecommunications network to perform data migration operations.

9. A computer system comprising:
a bus system;
a storage device connected to the bus system, wherein the storage device stores program instructions; and
a processor connected to the bus system, wherein the processor executes the program instructions to:
predict a time for delivery of one or more of one or more datasets to a target intermediate data delivery destination in a set of target intermediate data delivery destinations closest to a current geographic location of a mobile Internet of Things (IoT) device based on context and type of each detected data delivery event and the current geographic location of the mobile IoT device;
migrate the one or more of the one or more datasets to the target intermediate data delivery destination in the set closest to the current geographic location of the mobile IoT device according to the predicted time for delivery;
deliver the one or more of the one or more datasets to the mobile IoT device from the target intermediate data delivery destination in the set closest to the current geographic location of the mobile IoT device based on the context and the type of each detected data delivery event that corresponds to a particular dataset in the one or more datasets;
receive an indication that the mobile IoT device needs the one or more of the one or more datasets delivered to the mobile IoT device based on historical and real-time data corresponding to the mobile IoT device;
determine a frequency at which the one or more datasets are to be updated to be current; and
retrieve the one or more datasets at the determined frequency.

10. The computer system of claim 9, wherein the processor further executes the program instructions to:
detect data delivery events corresponding to transmission of the one or more datasets to the mobile IoT device;
parse the data delivery events to determine the context and the type of each detected data delivery event; and
identify the set of target intermediate data delivery destinations to transmit the one or more datasets to the mobile IoT device as the mobile IoT device moves according to a movement plan corresponding to the mobile IoT device.

11. The computer system of claim 9, wherein the processor further executes the program instructions to:
retrieve information regarding dataset access patterns of the mobile IoT device from a device profile corresponding to the mobile IoT device;
retrieve other relevant information corresponding to the delivery of the one or more of the one or more datasets to the mobile IoT device; and
determine a movement plan and a movement type corresponding to the mobile IoT device based on retrieved movement information corresponding to the mobile IoT device.

12. A computer program product comprising a computer readable storage medium having program instructions embodied therewith, the program instructions executable by a computer to cause the computer to perform a method comprising:
predicting, by the computer, a time for delivery of one or more of one or more datasets to a target intermediate data delivery destination in a set of target intermediate data delivery destinations closest to a current geographic location of a mobile Internet of Things (IoT) device based on context and type of each detected data delivery event and the current geographic location of the mobile IoT device;
migrating, by the computer, the one or more of the one or more datasets to the target intermediate data delivery destination in the set closest to the current geographic location of the mobile IoT device according to the predicted time for delivery;
delivering, by the computer, the one or more of the one or more datasets to the mobile IoT device from the target intermediate data delivery destination in the set closest to the current geographic location of the mobile IoT device based on the context and the type of each detected data delivery event that corresponds to a particular dataset in the one or more datasets;

receiving, by the computer, an indication that the mobile IoT device needs the one or more of the one or more datasets delivered to the mobile IoT device based on historical and real-time data corresponding to the mobile IoT device;

determining, by the computer, a frequency at which the one or more datasets are to be updated to be current; and retrieving, by the computer, the one or more datasets at the determined frequency.

13. The computer program product of claim 12 further comprising:

detecting, by the computer, data delivery events corresponding to transmission of the one or more datasets to the mobile IoT device;

parsing, by the computer, the data delivery events to determine the context and the type of each detected data delivery event; and identifying, by the computer, the set of target intermediate data delivery destinations to transmit the one or more datasets to the mobile IoT device as the mobile IoT device moves according to a movement plan corresponding to the mobile IoT device.

14. The computer program product of claim 12 further comprising:

retrieving, by the computer, information regarding dataset access patterns of the mobile IoT device from a device profile corresponding to the mobile IoT device;

retrieving, by the computer, other relevant information corresponding to the delivery of the one or more of the one or more datasets to the mobile IoT device; and determining, by the computer, a movement plan and a movement type corresponding to the mobile IoT device based on retrieved movement information corresponding to the mobile IoT device.

15. The computer program product of claim 12 further comprising:

classifying, by the computer, the one or more datasets based on a movement plan and a movement type; and detecting, by the computer, a set of data delivery events based on classification of the one or more datasets.

16. The computer program product of claim 12 further comprising:

migrating, by the computer, the one or more of the one or more datasets to the target intermediate data delivery destination in the set closest to the mobile IoT device based on dataset access patterns, other relevant information, movement plan, movement type, and the data delivery events corresponding to the mobile IoT device.

17. The computer program product of claim 12 further comprising:

updating, by the computer, data routing indices based on the delivery of the one or more of the one or more datasets to the target intermediate data delivery destination; and learning, by the computer, a set of data delivery events related to the delivery of the one or more of the one or more datasets to the target intermediate data delivery destination using a machine learning component of the computer.

* * * * *